US012285312B1

United States Patent
Lee

(10) Patent No.: US 12,285,312 B1
(45) Date of Patent: Apr. 29, 2025

(54) ORTHODONTIC APPLIANCE AND METHOD OF MANUFACTURING THE SAME

(71) Applicant: Maven Inc., Gyeongsangnam-do (KR)

(72) Inventor: Joon Ho Lee, Gyeongsangnam-do (KR)

(73) Assignee: Maven Inc., Gyeongsangnam-do (KR)

( * ) Notice: Subject to any disclaimer, the term of this patent is extended or adjusted under 35 U.S.C. 154(b) by 0 days.

(21) Appl. No.: 18/594,488

(22) Filed: Mar. 4, 2024

(30) Foreign Application Priority Data

Dec. 15, 2023 (KR) ........................ 10-2023-0183477

(51) Int. Cl.
*A61C 7/16* (2006.01)
*A61C 7/00* (2006.01)

(52) U.S. Cl.
CPC ................ *A61C 7/16* (2013.01); *A61C 7/002* (2013.01)

(58) Field of Classification Search
CPC .................................. A61C 7/16; A61C 7/002
USPC ......................................................... 382/128
See application file for complete search history.

(56) References Cited

U.S. PATENT DOCUMENTS

| 2011/0027743 A1* | 2/2011 | Cinader, Jr. ............. A61C 7/06 433/10 |
| 2014/0255865 A1* | 9/2014 | Gautam ................. A61C 7/002 433/9 |
| 2024/0018289 A1* | 1/2024 | Durban ............... C08F 222/102 |

FOREIGN PATENT DOCUMENTS

| KR | 1020020072318 A | 9/2002 |
| KR | 1020090043376 A | 5/2009 |
| KR | 1020100029486 A | 3/2010 |
| KR | 1020130125132 A | 11/2013 |
| KR | 102537013 B1 | 5/2023 |

OTHER PUBLICATIONS

International Search Report issued in corresponding International Application PCT/KR2024/020161, mailed Mar. 12, 2025.

* cited by examiner

*Primary Examiner* — Michael R Neff
(74) *Attorney, Agent, or Firm* — Burris Law, PLLC

(57) ABSTRACT

For an orthodontic appliance that may be easily and accurately attached to teeth and a method of manufacturing the orthodontic appliance, an orthodontic appliance including a slot configured to accommodate an orthodontic wire to be inserted and a contact portion configured to contact a positioner located on a surface of a tooth and a method of manufacturing the orthodontic appliance are provided.

11 Claims, 17 Drawing Sheets

ORTHODONTIC APPLIANCE AND METHOD OF MANUFACTURING THE SAME

CROSS-REFERENCE TO RELATED APPLICATION

This application is based on and claims priority under 35 U.S.C. § 119 to Korean Patent Application No. 10-2023-0183477, filed on Dec. 15, 2023, in the Korean Intellectual Property Office, the disclosure of which is incorporated by reference herein in its entirety.

FIELD

This application relates to an orthodontic appliance and a method of manufacturing the same, and more particularly, to an orthodontic appliance that may be easily and accurately attached to teeth and a method of manufacturing the orthodontic appliance.

BACKGROUND

Orthodontic appliances may be used to correct or treat crooked teeth or teeth with malocclusion. Also, orthodontic appliances may be used for cosmetic purposes to create a balanced outline through orthodontic treatment. Orthodontic appliances may have a configuration in which orthodontic appliances are fixed to teeth and an orthodontic wire is provided to connect the orthodontic appliances to each other. A force applied to the teeth through the orthodontic appliances by the orthodontic wire may forcibly move the teeth.

Conventional orthodontic appliances have a problem in that they may not be fixed at correct positions when fixed to teeth.

SUMMARY

To solve various problems including the above problem, embodiments provide an orthodontic appliance that may be easily and accurately attached to teeth and a method of manufacturing the orthodontic appliance. However, the embodiments are examples and do not limit the scope of the disclosure.

Additional aspects will be set forth in part in the description which follows and, in part, will be apparent from the description, or may be learned by practice of the presented embodiments.

According to an aspect of the disclosure, an orthodontic appliance includes a slot configured to accommodate an orthodontic wire to be inserted, and a contact portion configured to contact a positioner located on a surface of a tooth.

The slot may be located on one side, and the contact portion may include a groove formed in a tooth contact surface on another side opposite to the one side, wherein a portion of the tooth contact surface outside the groove includes a curved surface corresponding to the surface of the tooth to which the curved surface is to be attached.

When the curved surface is attached to the surface of the tooth, the positioner located on the surface of the tooth may contact the groove.

The curved surface may be attached to the surface of the tooth by an adhesive.

The slot may be located on one side, a tooth contact surface on another side opposite to the one side may include a curved surface corresponding to the surface of the tooth to which the curved surface is to be attached, the contact portion may include a part of a side surface between the one side and the tooth contact surface, and, when the curved surface is attached to the surface of the tooth, the positioner located on the surface of the tooth may contact the part of the side surface.

The curved surface may be attached to the surface of the tooth by an adhesive.

An outer surface of the positioner and an inner surface of the groove may be in surface contact with each other.

The orthodontic appliance may include a base plate and a slot forming portion protruding from the base plate and including the slot, wherein the groove has a shape recessed into the inside of the base plate.

The inner surface of the groove may contact a part of the outer surface of the positioner.

The inner surface of the groove may be in surface contact with the part of the outer surface of the positioner.

According to another aspect of the disclosure, a method of manufacturing an orthodontic appliance includes forming positioners each having a protruding shape on surfaces of a plurality of teeth to be corrected, obtaining scanning data on positions and shapes of the plurality of teeth to be corrected on which the positioners are formed, obtaining, based on the scanning data, modeling data on positions and shapes of the teeth in an expected state after correction, and obtaining, based on the modeling data, orthodontic appliance data on shapes of orthodontic appliances attachable to the surfaces of the teeth in the expected state after correction.

The method may further include forming, based on the orthodontic appliance data, orthodontic appliances to be attached to the surfaces of the plurality of teeth to be corrected, by using three-dimensional (3D) printing.

The obtaining of the orthodontic appliance data may include obtaining the orthodontic appliance data so that each of the orthodontic appliances has a shape in which a slot configured to accommodate an orthodontic wire to be inserted is formed on one side and a groove configured to contact a corresponding positioner from among the positioners is formed in a tooth contact surface on another side opposite to the one side.

The obtaining of the orthodontic appliance data may include obtaining the orthodontic appliance data so that each of the orthodontic appliances has a shape in which a portion of the tooth contact surface outside the groove located on the other side includes a curved surface corresponding to a surface of a tooth to which the curved surface is to be attached.

The obtaining of the orthodontic appliance data may include obtaining the orthodontic appliance data so that each of the orthodontic appliances has a shape in which an adhesive member is located between the portion of the tooth contact surface outside the groove located on the other side and the surface of the tooth to which the curved surface is to be attached.

The obtaining of the orthodontic appliance data may include obtaining the orthodontic appliance data so that each of the orthodontic appliances has a shape in which the corresponding positioner from among the positioners contacts the groove.

The obtaining of the orthodontic appliance data may include obtaining the orthodontic appliance data so that each of the orthodontic appliances has a shape in which a slot configured to accommodate an orthodontic wire to be inserted is formed on one side and a side surface configured to contact a corresponding positioner from among the positioners is located between the one side and a tooth contact surface on another side opposite to the one side.

The obtaining of the orthodontic appliance data may include obtaining the orthodontic appliance data so that each of the orthodontic appliances has a shape in which an outer surface of the corresponding positioner from among the positioners and an inner surface of the groove are in surface contact with each other.

The obtaining of the orthodontic appliance data may include obtaining the orthodontic appliance data so that each of the appliances has a shape in which the orthodontic appliance includes a base plate and a slot forming portion protruding from the base plate and including the slot and the groove has a shape recessed into the inside of the base plate.

The inner surface of the groove may contact a part of the outer surface of the positioner.

The inner surface of the groove may be in surface contact with the part of the outer surface of the positioner.

According to another aspect of the disclosure, a method of manufacturing an orthodontic appliance includes forming, based on the orthodontic appliance data obtained in the above manufacturing methods, orthodontic appliances to be attached to surfaces of a plurality of teeth to be corrected, by using three-dimensional (3D) printing.

The obtaining of the orthodontic appliance data may include obtaining the orthodontic appliance data so that each of the orthodontic appliances has a shape in which a slot configured to accommodate an orthodontic wire to be inserted is formed on one side and a groove configured to contact a corresponding positioner from among positioners is formed in a tooth contact surface on another side opposite to the one side.

The obtaining of the orthodontic appliance data may include obtaining the orthodontic appliance data so that each of the orthodontic appliances has a shape in which a portion of the tooth contact surface outside the groove located on the other side includes a curved surface corresponding to a surface of a tooth to which the curved surface is to be attached.

The obtaining of the orthodontic appliance data may include obtaining the orthodontic appliance data so that each of the orthodontic appliances has a shape in which an adhesive member is located between the portion of the tooth contact surface outside the groove located on the other side and the surface of the tooth to the curved surface is to be attached.

The obtaining of the orthodontic appliance data may include obtaining the orthodontic appliance data so that each of the orthodontic appliances has a shape in which the corresponding positioner from among the positioners contacts the groove.

The obtaining of the orthodontic appliance data may include obtaining the orthodontic appliance data so that each of the orthodontic appliances has a shape in which a slot configured to accommodate an orthodontic wire to be inserted is formed on one side and a side surface configured to contact a corresponding positioner from among the positioners is located between the one side and the tooth contact surface on another side opposite to the one side Other aspects, features, and advantages of the disclosure will become more apparent from the detailed description, the claims, and the drawings.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
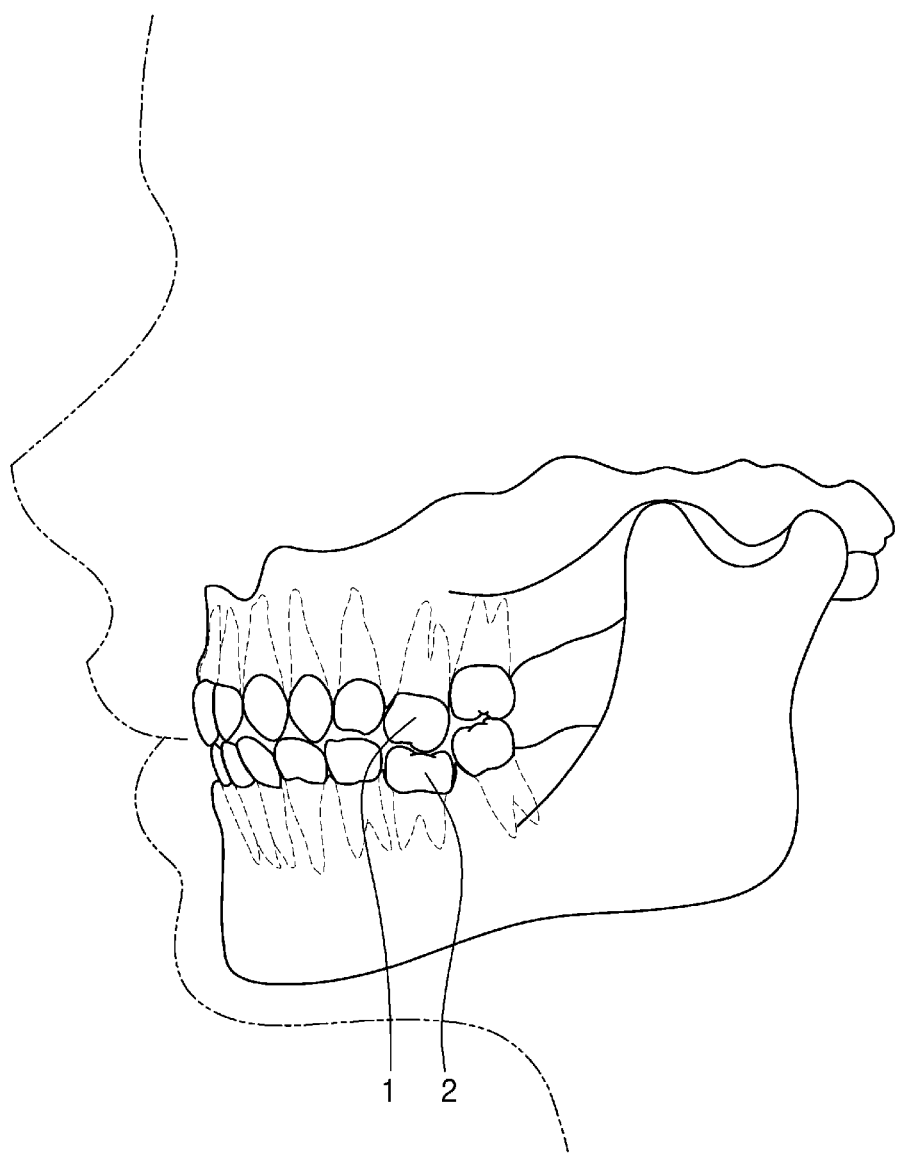
FIG. 1 is a conceptual view schematically illustrating a state of teeth that need to be corrected.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described in detail with reference to the accompanying drawings, wherein the same or corresponding elements are denoted by the same reference numerals throughout and a repeated description thereof is omitted.

It will be understood that when a component, such as a layer, a film, a region, or a plate, is referred to as being "on" another component, the component may be directly on the other component or intervening components may be present therebetween. Also, sizes of components in the drawings may be exaggerated or reduced for convenience of explanation. For example, because sizes and thicknesses of elements in the drawings are arbitrarily illustrated for convenience of explanation, the disclosure is not limited thereto.

In the following embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Although the terms "first," "second," etc. may be used to describe various elements, these elements should not be limited by these terms. These terms are only used to distinguish one element from another.

It will be further understood that the terms "comprises" or "comprising" used herein specify the presence of stated features or components, but do not preclude the presence or addition of one or more other features or components.

"A and/or B" is used herein to select only A, select only B, or select both A and B. "At least one of A and B" is used to select only A, select only B, or select both A and B.

It will be understood that when a layer, region, or component is referred to as being "connected," the layer, the region, or the component may be directly connected or may be indirectly connected with intervening layers, regions, or components therebetween.

Figure 2:
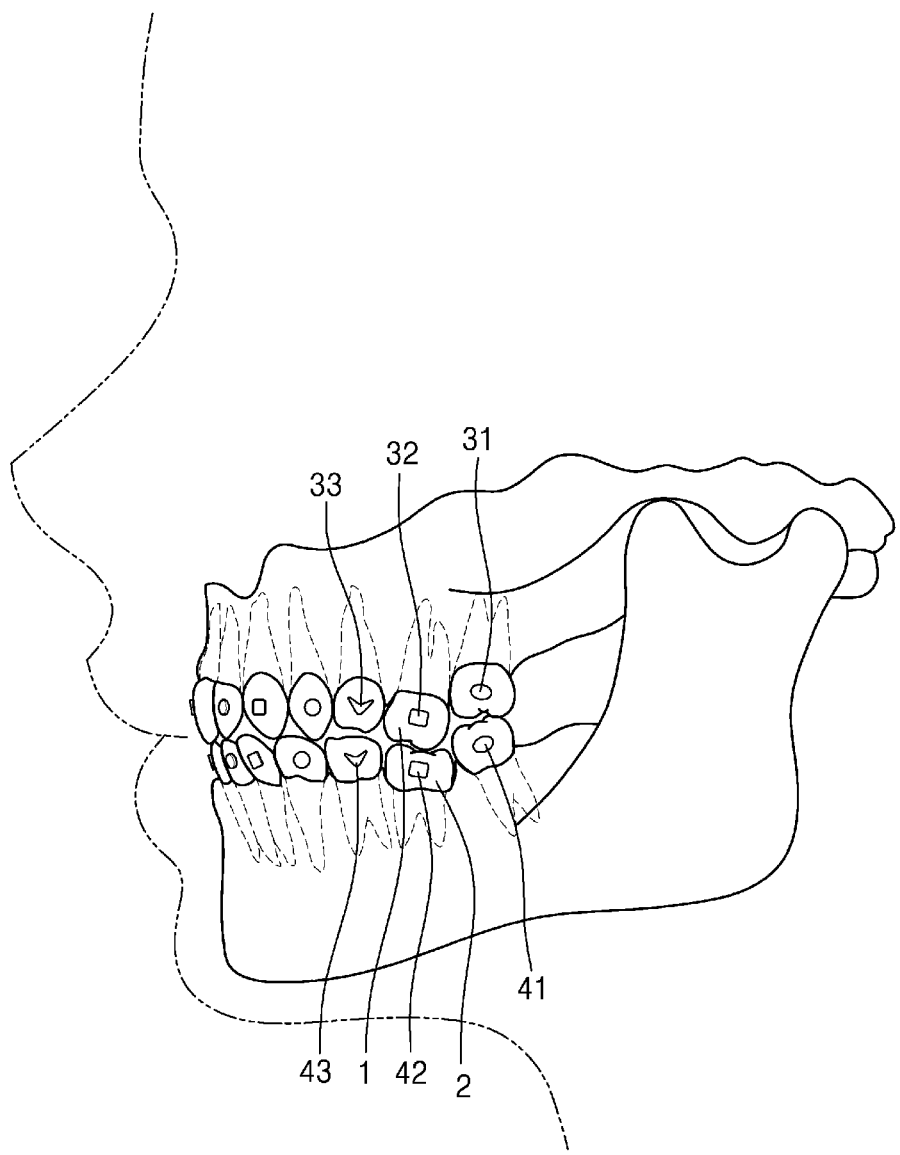
FIGS. 2 to 4 are conceptual views schematically illustrating a process of manufacturing an orthodontic appliance, according to an embodiment.
Figure 3:
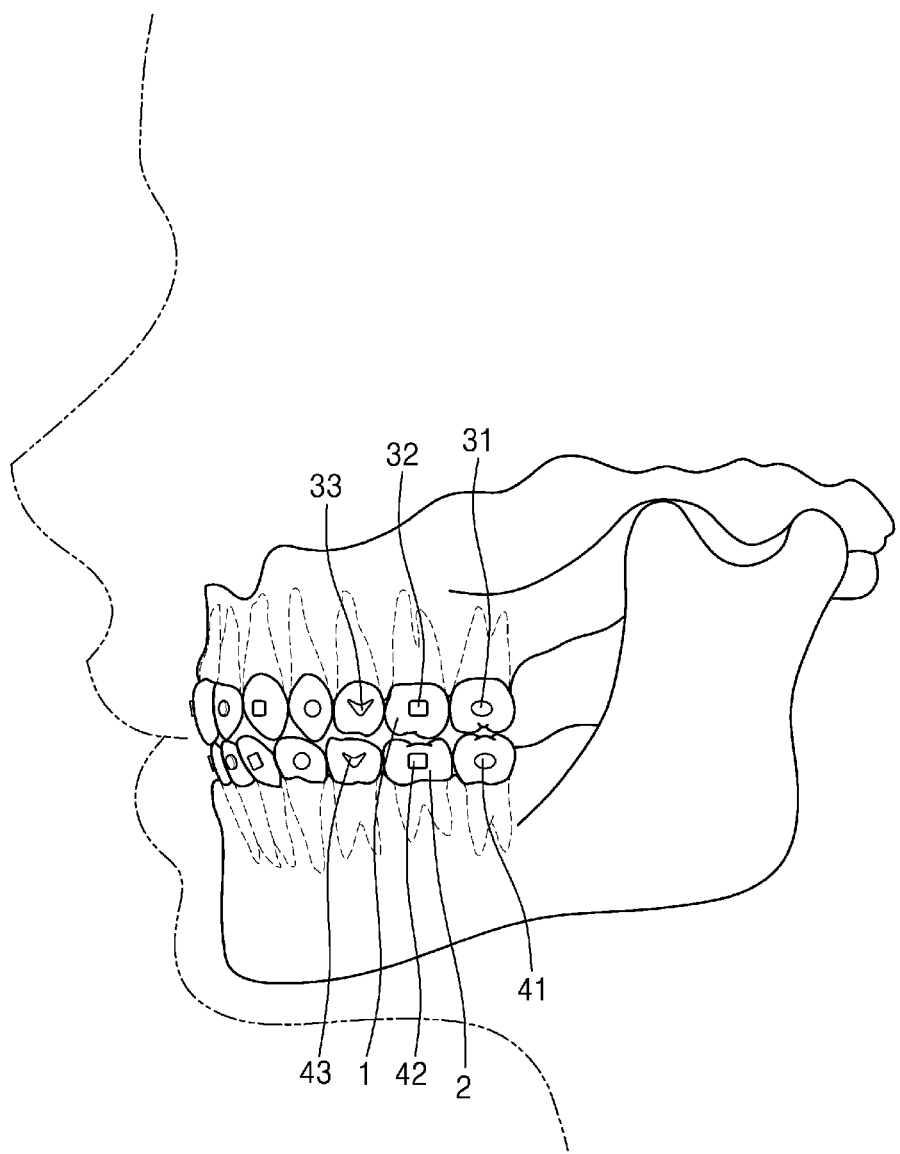
Figure 4:
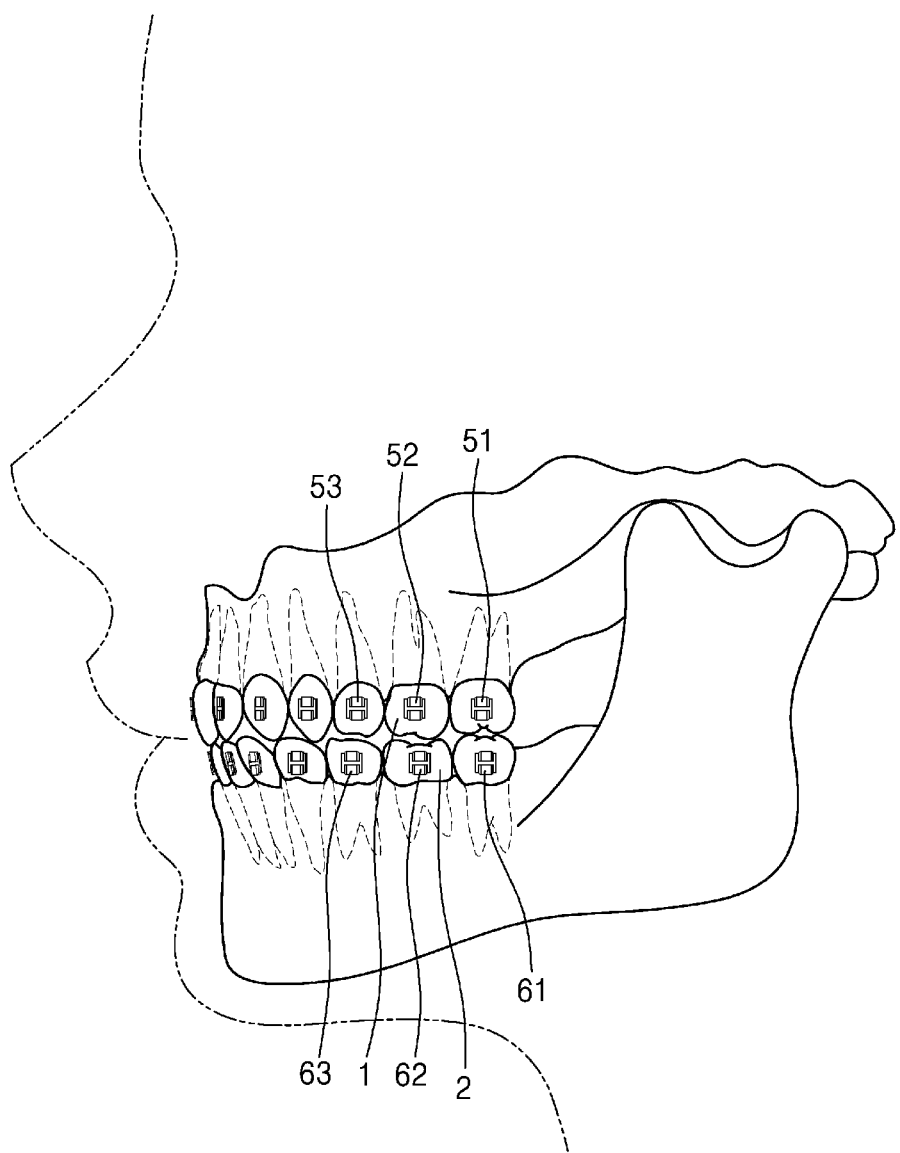

FIG. 1 is a side conceptual view schematically illustrating a state of teeth that need to be corrected. In FIG. 1, from among upper teeth, a tooth 1 (first molar) and teeth (second premolar and second molar) on both sides of the tooth 1 need to be corrected, and from among lower teeth, a tooth 2 (first molar) and teeth (second premolar and second molar) on both sides of the tooth 2 need to be corrected. FIGS. 2 to 4 are conceptual views schematically illustrating a process of manufacturing an orthodontic appliance, in relation to such a state as shown in FIG. 1, according to an embodiment.

First, as shown in FIG. 2, positioners 31, 32, 33, . . . , 41, 42, 43, . . . each having a protruding shape are located on surfaces of a plurality of teeth to be corrected. The positioners 31, 32, 33, . . . , 41, 42, 43, . . . may be directly formed on the surfaces of the plurality of teeth to be corrected by using resin. For example, the positioners 31, 32, 33, . . . , 41, 42, 43, . . . may be formed on the surfaces of the plurality of teeth to be corrected by using paste-type resin sold under the brand name GoTo. Alternatively, pre-prepared positioners each having a substantially rectangular parallelepiped shape may be attached to the surfaces of the plurality of teeth to be corrected by using an adhesive, or a part of each of the positioners may be fluidized (e.g., by using a method such as heating) and attached to the surfaces of the plurality of teeth to be corrected. An adhesive sold by a company such as 3M under a brand name such as Transbond may be used as the adhesive.

Each of the positioners 31, 32, 33, . . . , 41, 42, 43, . . . may be located on a corresponding tooth from among the teeth. As shown in FIG. 2, the positioners 31, 32, 33, . . . , 41, 42, 43, . . . may be formed not only on surfaces of teeth whose positions are to be adjusted but also on surfaces of teeth whose positions are not to be adjusted.

The positioners 31, 32, 33, . . . , 41, 42, 43, . . . do not need to have the same shape. Preferably, at least some of the positioners 31, 32, 33, . . . , 41, 42, 43, . . . may have different shapes. Because the positioners 31, 32, 33, . . . , 41, 42, 43, . . . have different shapes, an orthodontic appliance formed later may be coupled only to a corresponding positioner, which will be described below.

After the positioners 31, 32, 33, . . . , 41, 42, 43, . . . are located on the surfaces of the plurality of teeth to be corrected, scanning data, which is data on positions and shapes of the plurality of teeth to be corrected on which the positioners 31, 32, 33, . . . , 41, 42, 43, . . . are located, is obtained. That is, the scanning data on the positions and shapes of the teeth in the oral cavity in such a state as shown in FIG. 2 is obtained. Next, modeling data is obtained based on the obtained scanning data. The modeling data is data on positions and shapes of the teeth in an expected state after correction as shown in FIG. 3. That is, a virtual state in which the plurality of teeth to be corrected as shown in FIG. 2 have been corrected through correction is as shown in FIG. 3, and the modeling data is data on positions and shapes of the teeth in such a state as shown in FIG. 3.

When FIG. 3 is compared to FIG. 2, positions of the tooth 1 (first molar) and the teeth (second premolar and second molar) on both sides of the tooth 1 from among the upper teeth are changed and positions of the tooth 2 (first molar) and the teeth (second premolar and second molar) on both sides of the tooth 2 from among the lower teeth are changed. In detail, in the upper teeth, the tooth 1 (first molar) is moved upward while being rotated counterclockwise, the left tooth (second premolar) of the tooth 1 is rotated clockwise, and the right tooth (second molar) of the tooth 1 is moved downward. In the lower teeth, the tooth 1 (first molar) is moved upward while being rotated counterclockwise, the left tooth (second premolar) of the tooth 2 is rotated clockwise, and the right tooth (second molar) of the tooth 2 is moved downward while being rotated clockwise.

For reference, positions and shapes of the teeth when obtaining the scanning data or obtaining the modeling data may refer to positions and shapes of the teeth including the positioners 31, 32, 33, . . . , 41, 42, 43, . . . in a state where the positioners 31, 32, 33, . . . , 41, 42, 43, . . . are mounted. That is, shapes of the teeth when obtaining the scanning data or the obtaining modeling data may be shapes including the positioners 31, 32, 33, . . . , 41, 42, 43, . . . as well as the teeth themselves.

Of course, as shown in FIGS. 2 and 3, in the case of at least some of the positioners 31, 32, 33, . . . , 41, 42, 43, . . . , positions when obtaining the scanning data and positions when obtaining the modeling data may be different from each other. In FIGS. 2 and 3, in the case of the positioners 31, 32, 33, 41, 42, and 43 from among the positioners 31, 32, 33, . . . , 41, 42, 43, . . . , positions when obtaining the scanning data and positions when obtaining the modeling data are different from each other.

After the modeling data is obtained, orthodontic appliance data, which is data on shapes of (virtual) orthodontic appliances that may be attached to surfaces of the teeth in the expected state after correction, is obtained based on the obtained modeling data. FIG. 4 illustrates an expected state in which (virtual) orthodontic appliances 51, 52, 53, . . . , 61, 62, 63, . . . are attached to the surfaces of the teeth in the expected state after correction. That is, the (virtual) orthodontic appliances 51, 52, 53, . . . , 61, 62, 63, . . . having shapes as shown in FIG. 4 may be orthodontic appliances to be manufactured according to the final orthodontic appliance data.

Through this process, an orthodontic appliance that may be applied to specific teeth to be corrected may be manufactured. That is, an orthodontic appliance that may be applied to specific teeth to be corrected may be manufactured by using the orthodontic appliance data obtained through the above process. For example, the orthodontic appliances 51, 52, 53, . . . , 61, 62, 63, . . . to be attached to the surfaces of the plurality of teeth to be corrected, may be formed by using 3D printing based on the obtained orthodontic appliance data. Of course, a method other than 3D printing, such as ceramic pressing, milling, casting after wax printing, or shaping using molding, may be used.

Figure 5:
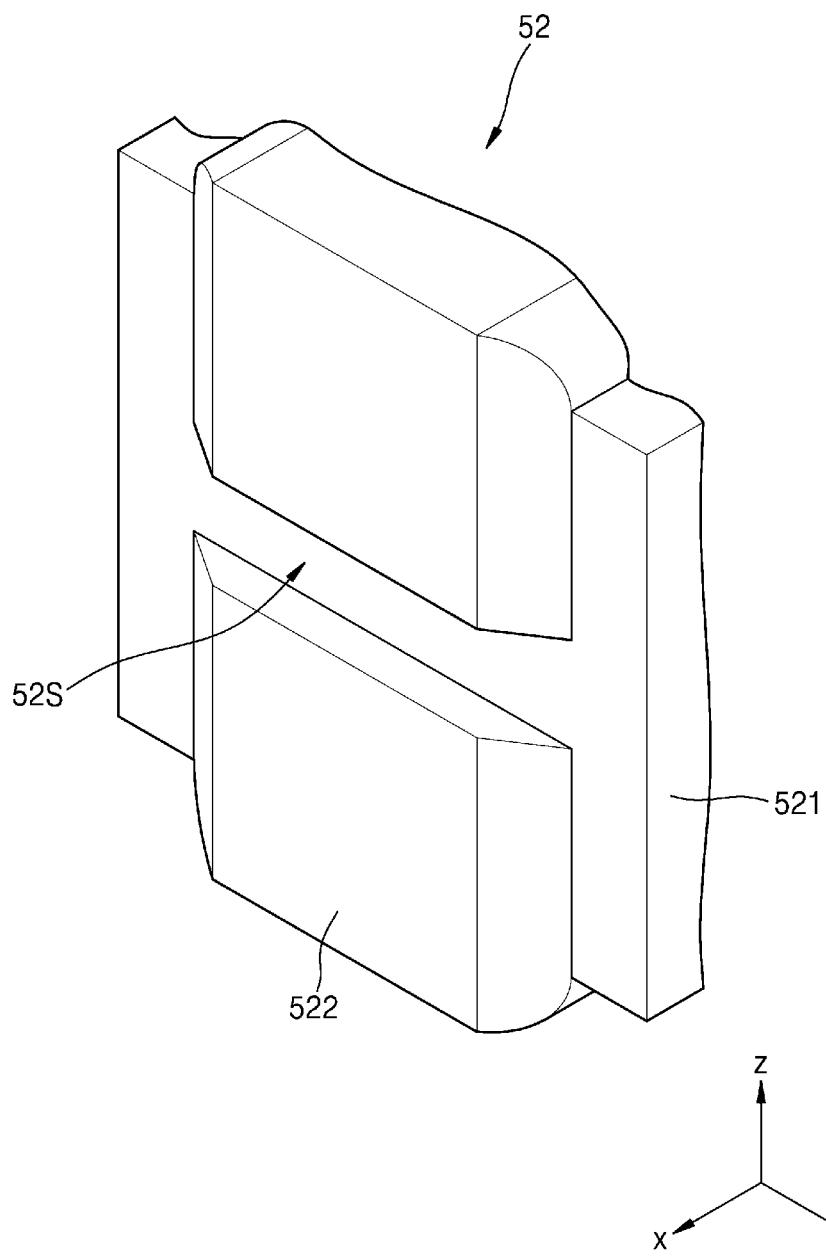
FIGS. 5 and 6 are perspective views schematically illustrating an orthodontic appliance, according to an embodiment.
Figure 6:
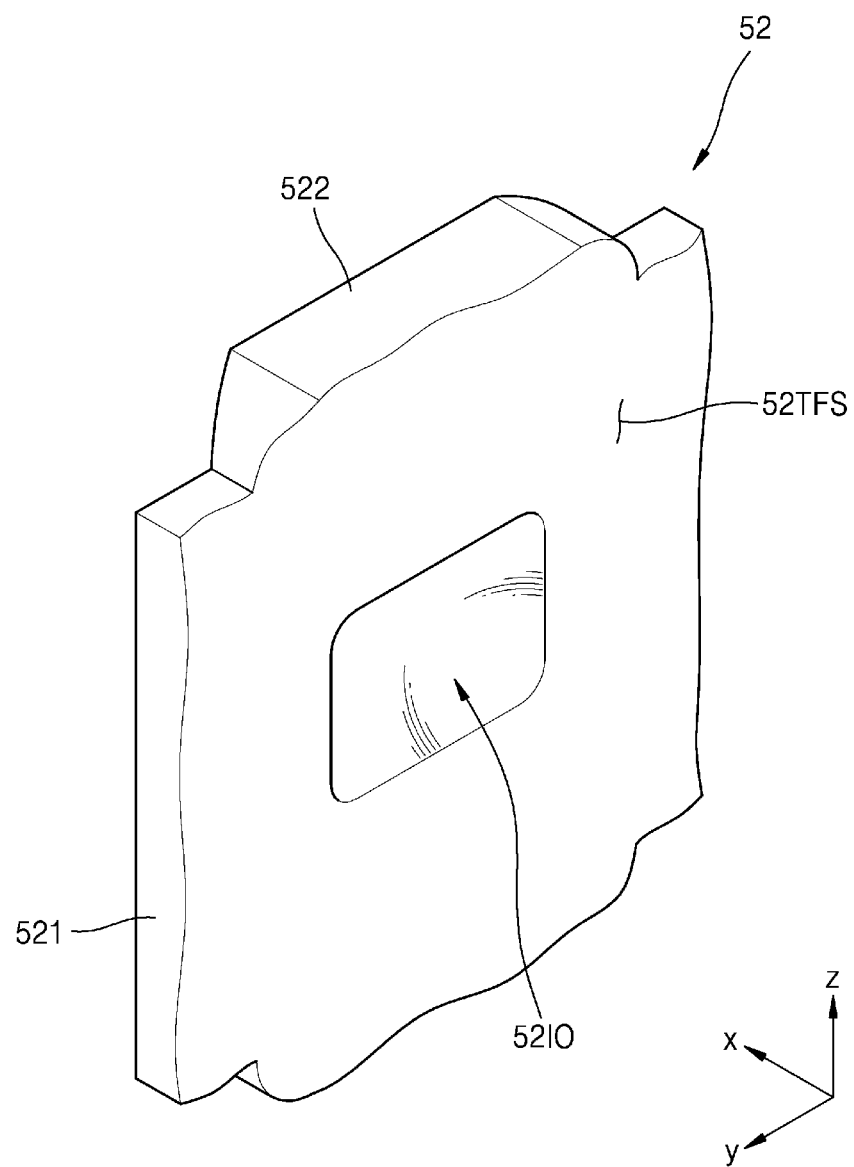

FIGS. 5 and 6 are perspective views schematically illustrating the orthodontic appliance 52 that may be attached to the tooth 1 (first molar) of the upper teeth, manufactured through the above process.

As shown in FIGS. 5 and 6, the orthodontic appliance 52 may include a slot 52S and a contact portion. In FIGS. 5 and 6, the contact portion includes a groove 5210. The slot 52S into which an orthodontic wire may be inserted later may be located on one side of the orthodontic appliance 52 (in a +x direction) as shown in FIG. 5. Because the orthodontic appliance 52 includes a tooth contact surface 52TFS on the other side (in a −x direction), which is opposite to the one side, the contact portion may include the groove 5210 located in the tooth contact surface 52TFS. The groove 5210 may have a shape into which the corresponding positioner 32 from among the positioners 31, 32, 33, . . . , 41, 42, 43, . . . may be inserted.

The orthodontic appliance 52 may have any of various shapes. In FIGS. 5 and 6, the orthodontic appliance 52 includes a base plate 521 and a slot forming portion 522 protruding from the base plate 521 (in the +x direction). The orthodontic appliance 52 may include two slot forming portions 522 spaced apart from each other (along a z axis) so that the slot 52S is defined by the two slot forming portions 522 and the base plate 521. In FIG. 5, the slot 52S is defined to extend along a y axis. A rear surface of the base plate 521 (in the −x direction) may be the tooth contact surface 52TFS. The slot forming portions 522 and the base plate 521 may be integrally formed with each other.

However, the disclosure is not limited thereto, and the orthodontic appliance 52 may have another shape. For example, the orthodontic appliance 52 may have a substantially cubic shape or rectangular parallelepiped shape and may include the slot 52S formed on one side (in the +x direction) and the groove 5210 in the tooth contact surface 52TFS on the other side (in the −x direction). Also, various modifications may be made. For example, the orthodontic appliance 52 may include a hook or the like such that an anti-separation wire for preventing an orthodontic wire inserted into the slot 52S from being separated from the orthodontic appliance 52 may be coupled to the hook or the like.

When the orthodontic appliance 52 is attached to the tooth 1, the tooth contact surface 52TFS of the orthodontic appliance 52 is a surface of the orthodontic appliance 52 facing a surface of the tooth 1. Accordingly, although the tooth contact surface 52TFS of the orthodontic appliance 52 has a substantially flat shape, the tooth contact surface 52TFS of the orthodontic appliance 52 may have a shape corresponding to the surface of the tooth 1 to which the orthodontic appliance 52 is attached, rather than a perfectly flat surface. That is, a portion of the tooth contact surface 52TFS outside the groove 5210 may include a curved surface corresponding to the surface of the tooth 1. This is because the modeling data that is data on positions and shapes of the teeth in the expected state after correction as shown in FIG. 3 is obtained, and then the orthodontic appliance data on shapes of the orthodontic appliances that may be attached to the surfaces of the teeth in the expected state after correction is obtained based on the modeling data. The curved surface included in the tooth contact surface 52TFS of the orthodontic appliance 52 may be attached to the surface of the tooth 1 through an adhesive.

In a state where the positioners 31, 32, 33, . . . , 41, 42, 43, . . . each having a protruding shape are attached to the teeth as shown in FIG. 3, the modeling data that is data on positions and shapes of the teeth in the expected state after correction is obtained, and then, the orthodontic appliance data on shapes of the orthodontic appliances that may be attached to the teeth in the expected state after correction is obtained based on the modeling data. Accordingly, the groove 5210 of the orthodontic appliance 52 may have a shape corresponding only to the corresponding positioner 32 from among the positioners 31, 32, 33, . . . , 41, 42, 43, . . . . Accordingly, when the orthodontic appliances are attached later to the teeth to be corrected, each of the orthodontic appliances may be accurately attached to a corresponding tooth.

Figure 7:
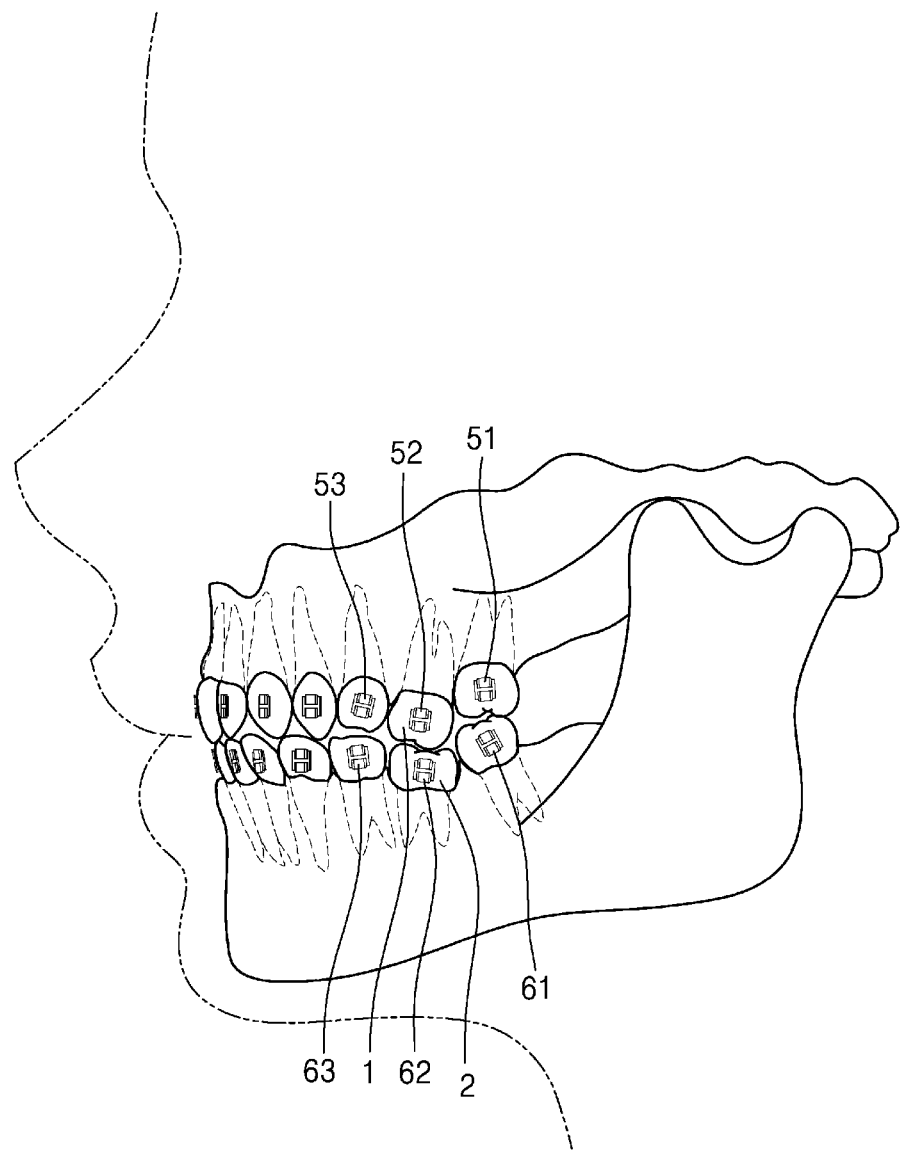
FIGS. 7 to 9 are conceptual views schematically illustrating a process of correcting teeth by using an orthodontic appliance, according to an embodiment.
Figure 8:
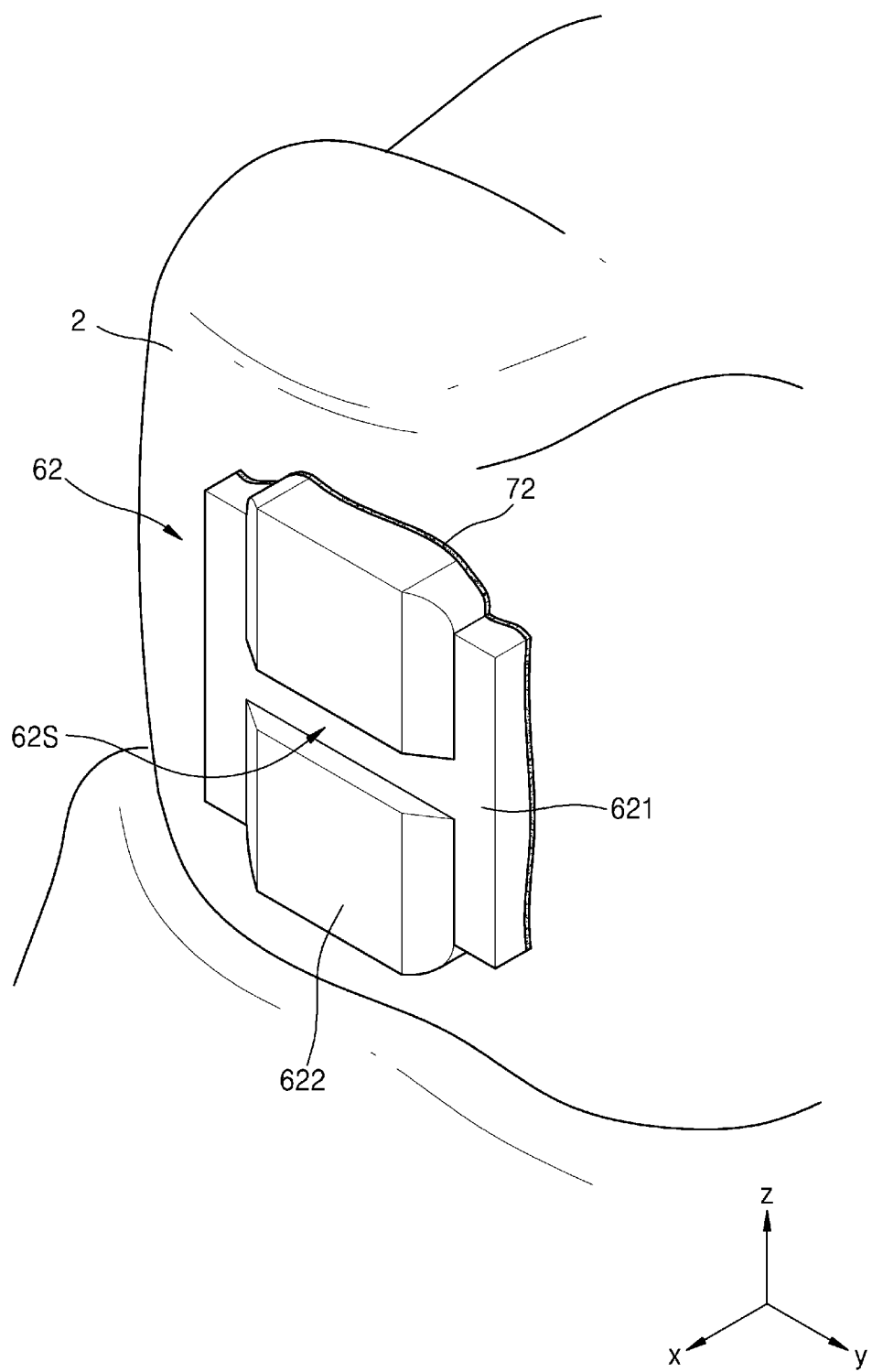
Figure 9:
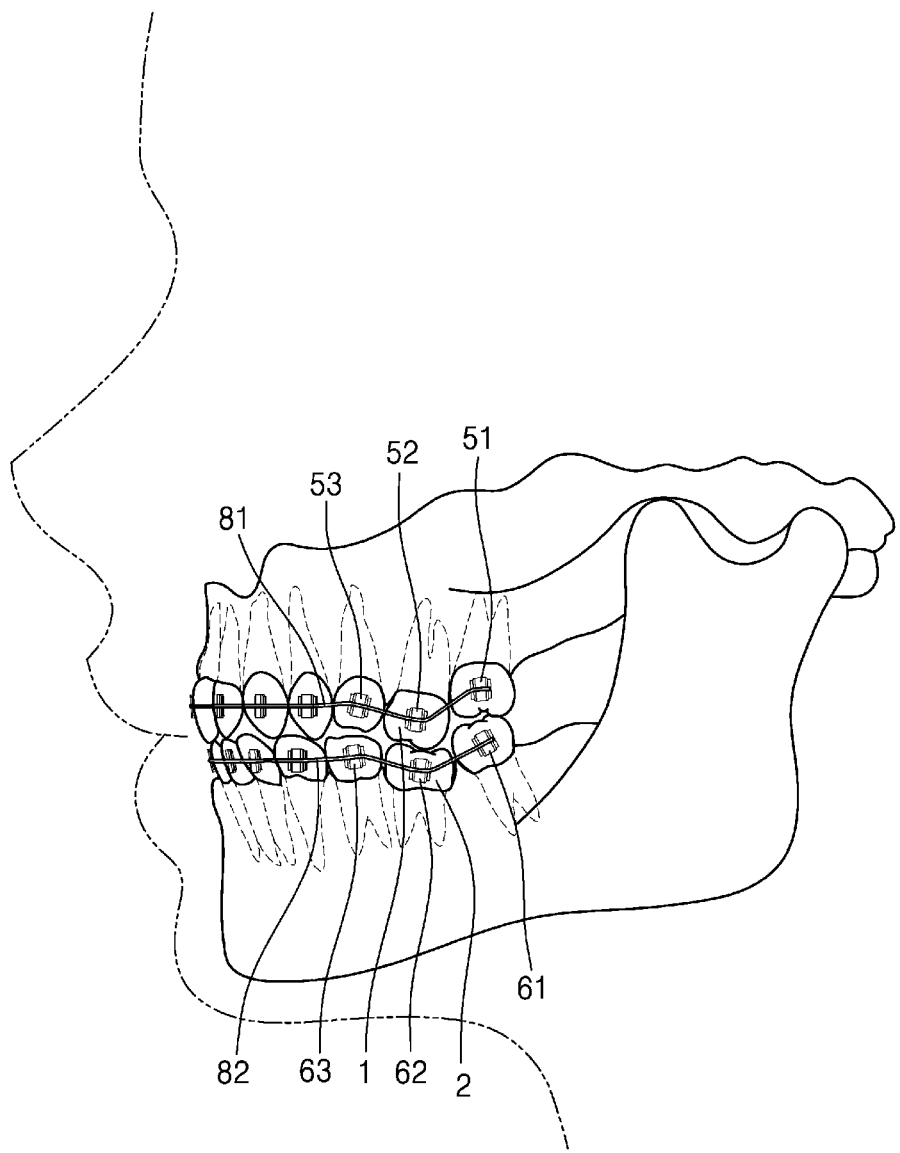

FIGS. 7 to 9 are conceptual views schematically illustrating a process of correcting teeth by using an orthodontic appliance, according to an embodiment.

As shown in FIG. 7, each of the prepared orthodontic appliances 51, 52, 53, . . . , 61, 62, 63, . . . is attached to a surface of a corresponding one of the plurality of teeth to be corrected. For example, the orthodontic appliance 52 may be attached to a surface of the tooth 1 (first molar) of the upper teeth, the orthodontic appliance 51 may be attached to a surface of the second molar of the upper teeth, and the orthodontic appliance 53 may be attached to a surface of the second premolar of the upper teeth. Likewise, the orthodontic appliance 62 may be attached to a surface of the tooth 2 (first molar) of the lower teeth, the orthodontic appliance 61 may be attached to a surface of the second molar of the lower teeth, and the orthodontic appliance 63 may be attached to a surface of the second premolar of the lower teeth. Each of the other orthodontic appliances may be attached to a surface of a corresponding tooth.

FIG. 8 is a perspective view schematically illustrating an example where the orthodontic appliance 62 is attached to a surface of the tooth 2 (first molar) of the lower teeth. In FIG. 8, the orthodontic appliance 62 includes a base plate 621 and slot forming portions 622 protruding from the base plate 621 (in the +x direction), and a slot 62S is defined by the base plate 621 and the slot forming portions 622 (in the +x direction). The orthodontic appliance 62 may be attached to the tooth 2 through an adhesive 72. For example, an adhesive sold by a company such as 3M under a brand name such as Transbond may be used as the adhesive 72. In this case, the adhesive 72 may be located between a portion of a tooth contact surface outside a groove and the tooth 2. That is, the adhesive may not be located in the groove of the orthodontic appliance 62.

As described above, the groove of the orthodontic appliance 62 may have a shape into which the corresponding positioner 42 from among the positioners 31, 32, 33, . . . , 41, 42, 43, . . . may be inserted. In detail, the groove of the orthodontic appliance 62 may have a shape corresponding only to the corresponding positioner 42 from among the positioners 31, 32, 33, . . . , 41, 42, 43, . . . . Accordingly, when the adhesive 72 is located between an inner surface of the groove of the orthodontic appliance 62 and an outer surface of the positioner 42, the positioner 42 may not be accurately engaged with the groove of the orthodontic appliance 62. This may eventually cause a problem that the orthodontic appliance 62 may not be located at an accurate position preset on the tooth 2.

Hence, the adhesive may not be located in the groove of the orthodontic appliance 62. To this end, the adhesive 72 may be applied only to a portion of the surface of the tooth 2 outside the positioner 42 and then the orthodontic appliance 62 may be located on the tooth 2, or the adhesive 72 may be applied only to a portion of the tooth contact surface of the orthodontic appliance 62 outside the groove and then the orthodontic appliance 62 may be located on the tooth 2. This applies to the following embodiments and modifications thereof.

Through this process, when a curved surface of the tooth contact surface of the orthodontic appliance 62 is attached to the surface of the tooth 2, the positioner 42 located on the surface of the tooth 2 may contact the groove of the orthodontic appliance 62. For example, when the curved surface of the tooth contact surface of the orthodontic appliance 62 is attached to the surface of the tooth 2, the positioner 42 located on the surface of the tooth 2 may be fitted into the groove of the orthodontic appliance 62. That is, when the curved surface of the tooth contact surface of the orthodontic appliance 62 is attached to the surface of the tooth 2, the outer surface of the positioner 42 located on the surface of the tooth 2 and the inner surface of the groove of the orthodontic appliance 62 may be in surface contact with each other. However, the disclosure is not limited thereto, and when the curved surface of the tooth contact surface of the orthodontic appliance 62 is attached to the surface of the tooth 2, as long as the positioner 42 located on the surface of the tooth 2 contacts the groove of the orthodontic appliance 62, this may fall within the scope of the disclosure.

In this way, the orthodontic appliances 51, 52, 53, . . . , 61, 62, 63, . . . are attached to the surfaces of the plurality of teeth to be corrected as shown in FIG. 7, and then orthodontic wires 81 and 82 are mounted on the orthodontic appliances 51, 52, 53, . . . , 61, 62, 63, . . . as shown in FIG. 9. In FIG. 9, the orthodontic wire 81 is inserted into a slot of each of the orthodontic appliances 51, 52, 53, . . . attached to the upper teeth, and the orthodontic wire 82 is inserted into a slot of each of the orthodontic appliances 61, 62, 63, . . . attached to the lower teeth. The orthodontic wires 81 and 82 may apply a force in a specific direction to the teeth through the orthodontic appliances 51, 52, 53, . . . , 61, 62, 63, . . . to gradually change positions of the teeth, thereby finally completing the teeth in such a state as shown in FIG. 4.

The orthodontic appliances 51, 52, 53, . . . , 61, 62, 63, . . . and a method of manufacturing the same have been described, but the disclosure is not limited thereto. For example, a method of correcting the teeth by using the orthodontic appliances 51, 52, 53, . . . , 61, 62, 63, . . . may also be within the scope of the disclosure. This applies to the following embodiments and modifications thereof.

In some cases, at least one of the orthodontic appliances 51, 52, 53, . . . , 61, 62, 63, . . . already attached to the teeth may need to be separated from a tooth and then the orthodontic appliance or a new orthodontic appliance may need to be attached to the tooth again. This is because the orthodontic appliance may be damaged during a mounting process or the orthodontic appliance may be damaged in daily life after mounted. As described above, according to a method of correcting teeth, an orthodontic appliance, or a method of manufacturing the orthodontic appliance according to an embodiment, an adhesive may not be located in a groove of an orthodontic appliance when the orthodontic appliance is attached to a tooth. Accordingly, even when the orthodontic appliance is separated from the tooth, a positioner on a surface of the tooth may not be damaged. As a result, when only a required orthodontic appliance is formed by using previously obtained orthodontic appliance data, a groove of the orthodontic appliance may be accurately engaged with the positioner of the tooth and the orthodontic appliance may be accurately attached to the tooth.

Figure 10:
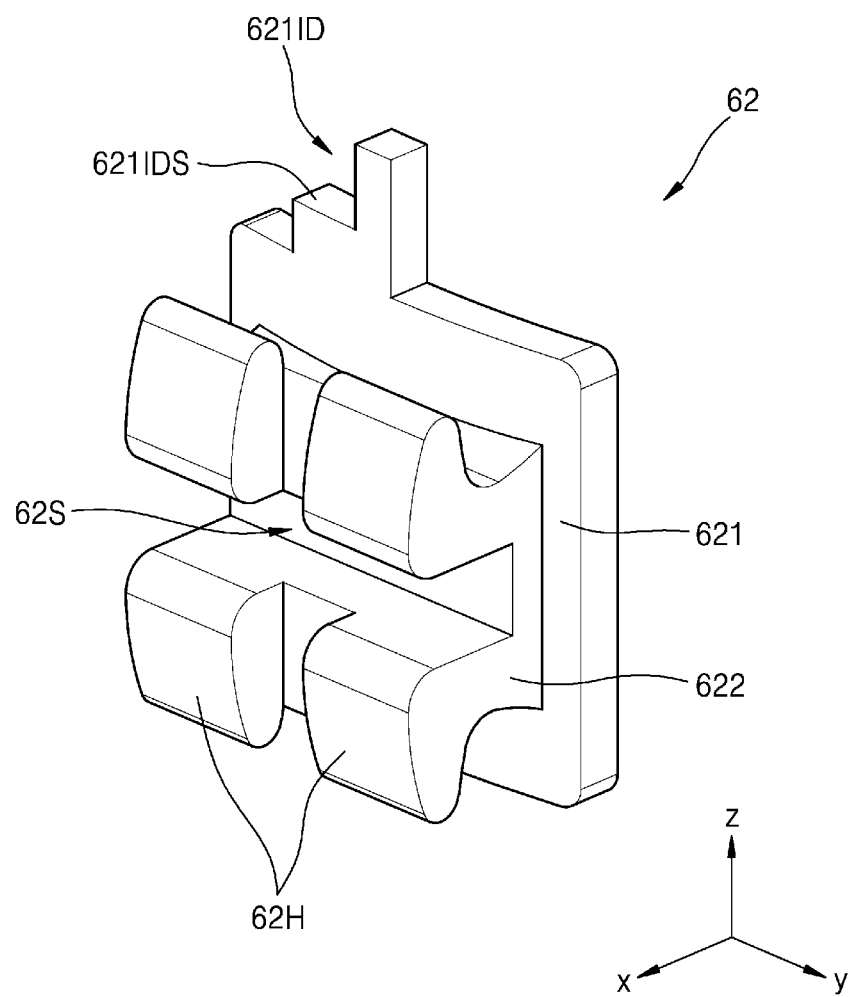
FIG. 10 is a perspective view schematically illustrating an orthodontic appliance, according to an embodiment.
Figure 11:
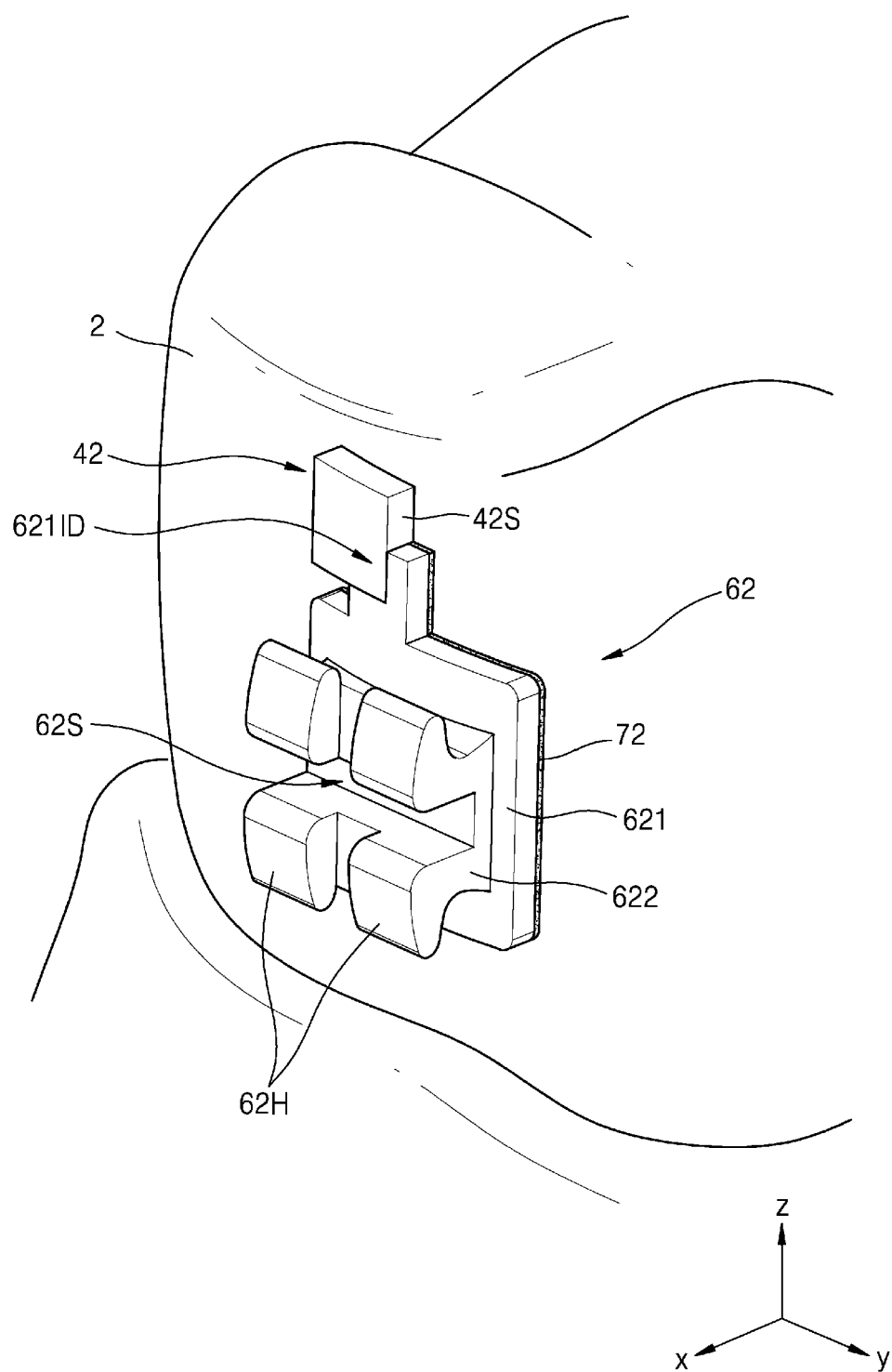
FIG. 11 is a conceptual view schematically illustrating a process of correcting teeth by using the orthodontic appliance of FIG. 10.

FIG. 10 is a perspective view schematically illustrating the orthodontic appliance 62, according to an embodiment. FIG. 11 is a conceptual view schematically illustrating a process of correcting the tooth 2 by using the orthodontic appliance 62 of FIG. 10 and the positioner 42.

As shown in FIG. 10, the orthodontic appliance 62 may include a base plate 621 and a slot forming portion 622 protruding from the base plate 621 (in the +x direction). The slot forming portion 622 and the base plate 621 may be integrally formed with each other. A rear surface of the base plate 621 (in the −x direction) may be a tooth contact surface. The orthodontic appliance 62 may include a slot 62S and a groove.

The slot 62S into which an orthodontic wire may be inserted later as described above may be located on one side of the orthodontic appliance 62 of the orthodontic appliance 62 (in the +x direction) as shown in FIG. 10. The slot forming portion 622 may have an inwardly concave portion to define the slot 62S (extending along the y axis). The slot forming portion 622 may include hooks 62H as shown in FIG. 10, when necessary. An anti-separation wire or the like may be fastened to the hooks 62H to prevent the orthodontic wire inserted into the slot 62S from being separated from the orthodontic appliance 62. For example, the orthodontic wire may be located in the slot 62S and then the anti-separation wire having a ring shape may be fastened to the hooks 62H that are vertically located (in the z axis direction) to prevent the orthodontic wire inserted into the slot 62S from being separated from the orthodontic appliance 62.

A groove of a contact portion may be defined by the base plate 621. For example, as shown in FIG. 10, the base plate 621 may include a recessed portion (or an indented portion) 621ID that is recessed (or indented) inward. The groove of the contact portion of the orthodontic appliance 62 may be the recessed portion 621ID. That is, the groove of the orthodontic appliance 62 may have a shape that is recessed (or indented) into the inside of the base plate 621.

In FIG. 10, the base plate 621 includes a protrusion protruding in the +z direction, and the protrusion may include the recessed portion (or indented portion) 621ID that is recessed (or indented) inward to define the groove of the orthodontic appliance 62. However, the disclosure is not limited thereto. For example, the base plate 621 may not include the protrusion and may have a substantially rectangular or square shape (when viewed in a direction perpendicular to the x axis), but a portion of the base plate 621 may be recessed (or indented) inward to define the groove of the orthodontic appliance 62.

The base plate 621 of the orthodontic appliance 62 may include the tooth contact surface on a side (in the −x direction), opposite to a side where the slot forming portion 622 is located, and the orthodontic appliance 62 may be attached to the tooth so that the tooth contact surface faces a surface of the tooth. The description of the tooth contact surface made with reference to FIG. 6, etc. may apply to the tooth contact surface.

FIG. 11 schematically illustrates an example where the orthodontic appliance 62 is attached to the tooth 2. As shown in FIG. 11, the groove of the orthodontic appliance in the shape of the recessed portion 621ID may have a shape that may contact the corresponding positioner 42 from among the positioners 31, 32, 33, . . . , 41, 42, 43, . . . . In detail, an inner surface 621IDS (see FIG. 10) of the groove of the orthodontic appliance 62 in the shape of the recessed portion (or the indented portion) 621ID may contact a part of an outer surface 42S of the positioner 42. In FIG. 11, the inner surface 621IDS of the groove of the orthodontic appliance 62 in the shape of the recessed portion (or the indented portion) 621ID is in surface contact with a part of the outer surface 42S of the positioner 42.

As described above, in a state where the positioners 31, 32, 33, ..., 41, 42, 43, ... each having a protruding shape are attached to the teeth, modeling data that is data on positions and shapes of the teeth in an expected state after correction is obtained, and orthodontic appliance data on shapes of (virtual) orthodontic appliances that may be attached to surfaces of the teeth in the expected state after correction is obtained based on the modeling data. The groove of the orthodontic appliance 62 in the shape of the recessed portion 621ID, manufactured by using the orthodontic appliance data may correspond to the corresponding positioner 42 from among the positioners 31, 32, 33, ..., 41, 42, 43, ....

As shown in FIG. 11, the orthodontic appliance 62 may be attached to the tooth 2 through the adhesive 72. An adhesive sold by a company such as 3M under a brand name such as Transbond may be used as the adhesive 72. In this case, the adhesive 72 may be located between the tooth 2 and the tooth contact surface of the base plate 621. That is, the adhesive may not be located between the inner surface 621IDS of the groove of the orthodontic appliance 62 in the shape of the recessed portion 621ID and the outer surface 42S of the positioner 42.

The groove of the orthodontic appliance 62 may have a shape corresponding to the corresponding positioner 42 from among the positioners 31, 32, 33, ..., 41, 42, 43, .... Accordingly, when the adhesive 72 is located between the outer surface 42S of the positioner 42 and the inner surface 621IDS of the groove of the orthodontic appliance 62 in the shape of the recessed portion 621ID, the positioner 42 may not be accurately engaged with the groove of the orthodontic appliance 62. This may cause a problem that the orthodontic appliance 62 is not located at an accurate position preset on the tooth 2. Hence, the adhesive should not be located between the outer surface 42S of the positioner 42 and the inner surface 621IDS of the groove of the orthodontic appliance 62 in the shape of the recessed portion 621ID. This applies to the following embodiments and modifications thereof.

As long as the inner surface 621IDS of the groove of the orthodontic appliance 62 (see FIG. 10) in the shape of the recessed portion 621ID contacts a part of the outer surface 42S of the positioner 42 as shown in FIG. 11, the orthodontic appliance 62 is accurately located at a preset position on the tooth 2. In FIG. 11, the inner surface 621IDS of the groove in the shape of the recessed portion 621ID is in surface contact with a part of each of two outer surfaces from among four outer surfaces 42S of the positioner 42 having a substantially flat rectangular parallelepiped shape. Through this configuration, the orthodontic appliance 62 may be easily and simply located on the surface of the tooth 2 and may be accurately located at a preset position.

As described with reference to FIGS. 5 and 6, the contact portion of the orthodontic appliance 52 may include the groove 52IO. The groove 52IO may be located in the tooth contact surface 52TFS on the other side (in the −x direction), opposite to one side as shown in FIG. 6. However, the disclosure is not limited to the groove 52IO being located inside the tooth contact surface 52TFS as shown in FIG. 6.

Figure 12:
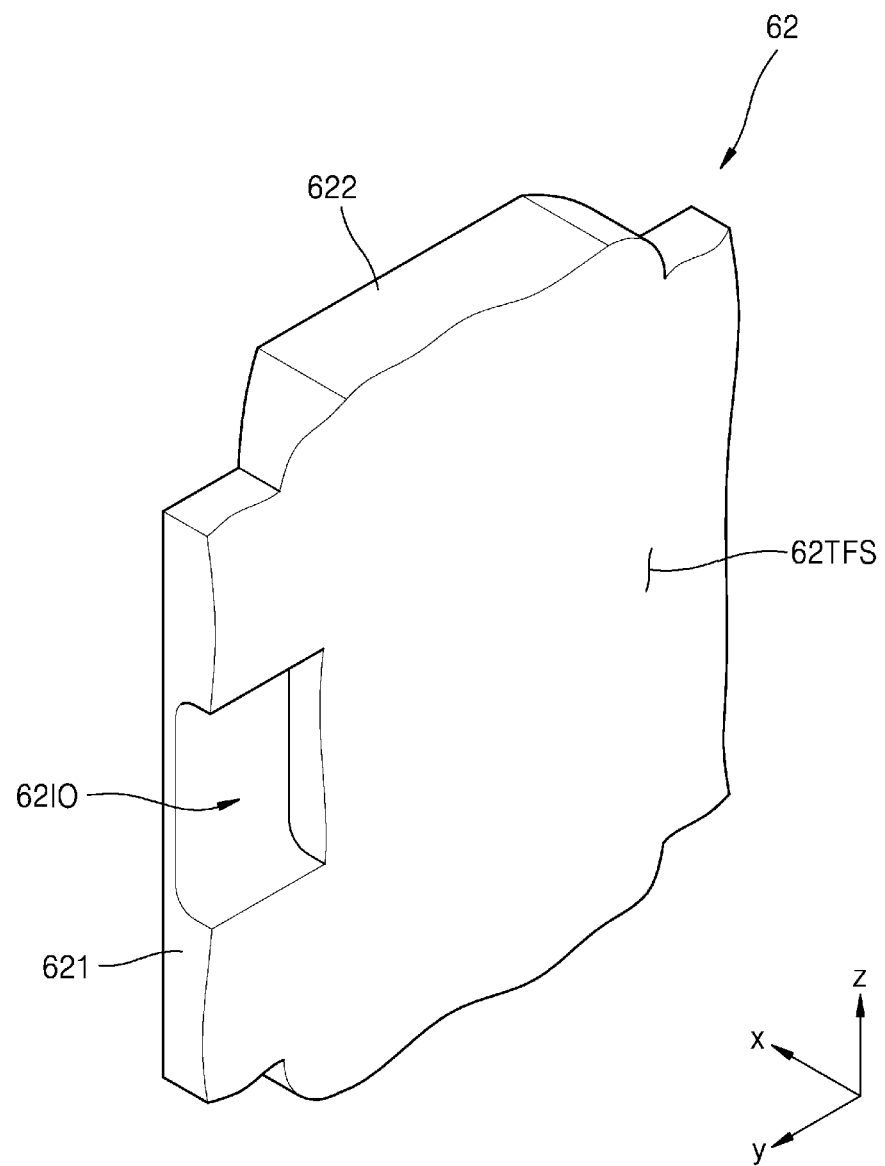
FIG. 12 is a perspective view schematically illustrating an orthodontic appliance, according to an embodiment.

For example, as shown in FIG. 12 that is a perspective view schematically illustrating the orthodontic appliance 62 according to an embodiment, the orthodontic appliance 62 may have a shape in which a groove 62IO is located in a tooth contact surface 62TFS but a part of the groove 62IO is open to the outside of the orthodontic appliance 62. In FIG. 12, the groove 62IO extends in a side surface located between one side (+x direction) and the other side (−x direction) of the orthodontic appliance 62.

Even in this orthodontic appliance 62 according to the present embodiment, the groove 62IO of the orthodontic appliance 62 may have a shape corresponding to the corresponding positioner 42 from among the positioners 31, 32, 33, ..., 41, 42, 43, .... In this case, the entire corresponding positioner 42 from among the positioners 31, 32, 33, ..., 41, 42, 43, ... may be inserted into the groove 62IO of the orthodontic appliance 62. Alternatively, a part of the corresponding positioner 42 from among the positioners 31, 32, 33, ..., 41, 42, 43, ... may be inserted into the groove 62IO of the orthodontic appliance 62.

Figure 13:
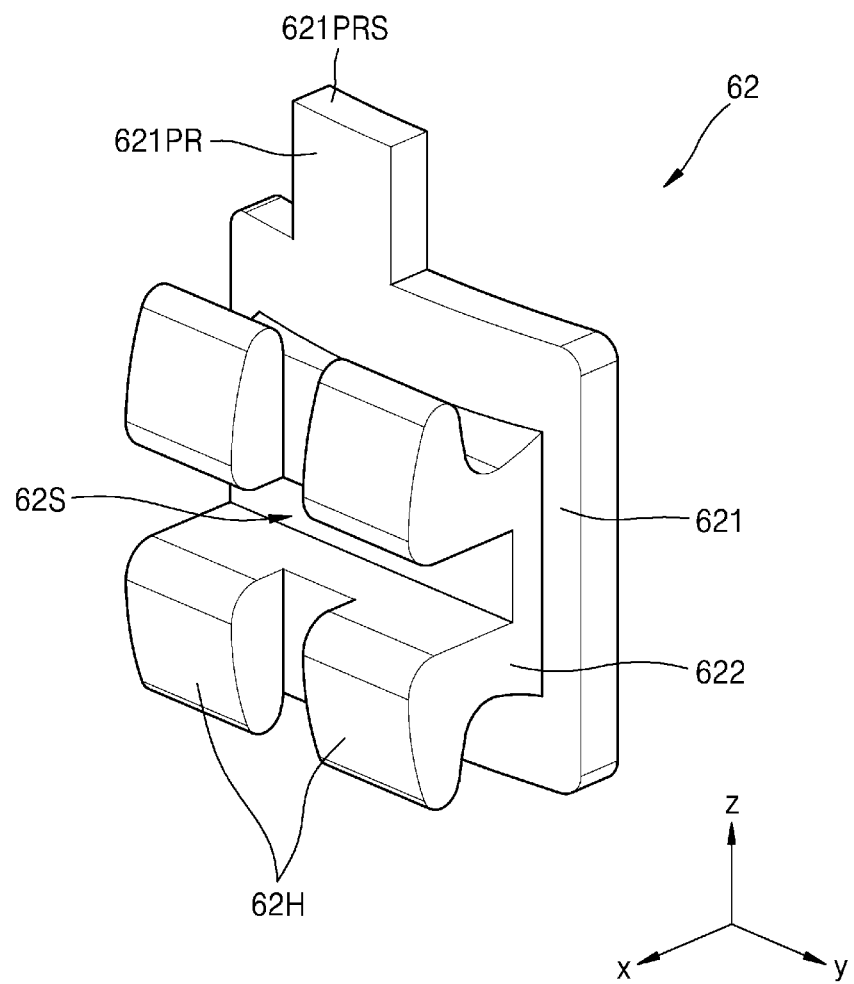
FIG. 13 is a perspective view schematically illustrating an orthodontic appliance, according to an embodiment.

Although a contact portion of the orthodontic appliance 62 includes a groove and the recessed portion 621ID of the base plate 621 which is recessed (or is indented) inward is the groove in the embodiment described with reference to FIGS. 10 and 11, the disclosure is not limited thereto. For example, as shown in FIG. 13 schematically illustrating the orthodontic appliance 62 according to an embodiment, the base plate 621 may include a protrusion 621PR protruding in the +z direction and a side surface 621PRS of the protrusion 621PR may be a contact portion of the orthodontic appliance 62.

Figure 14:
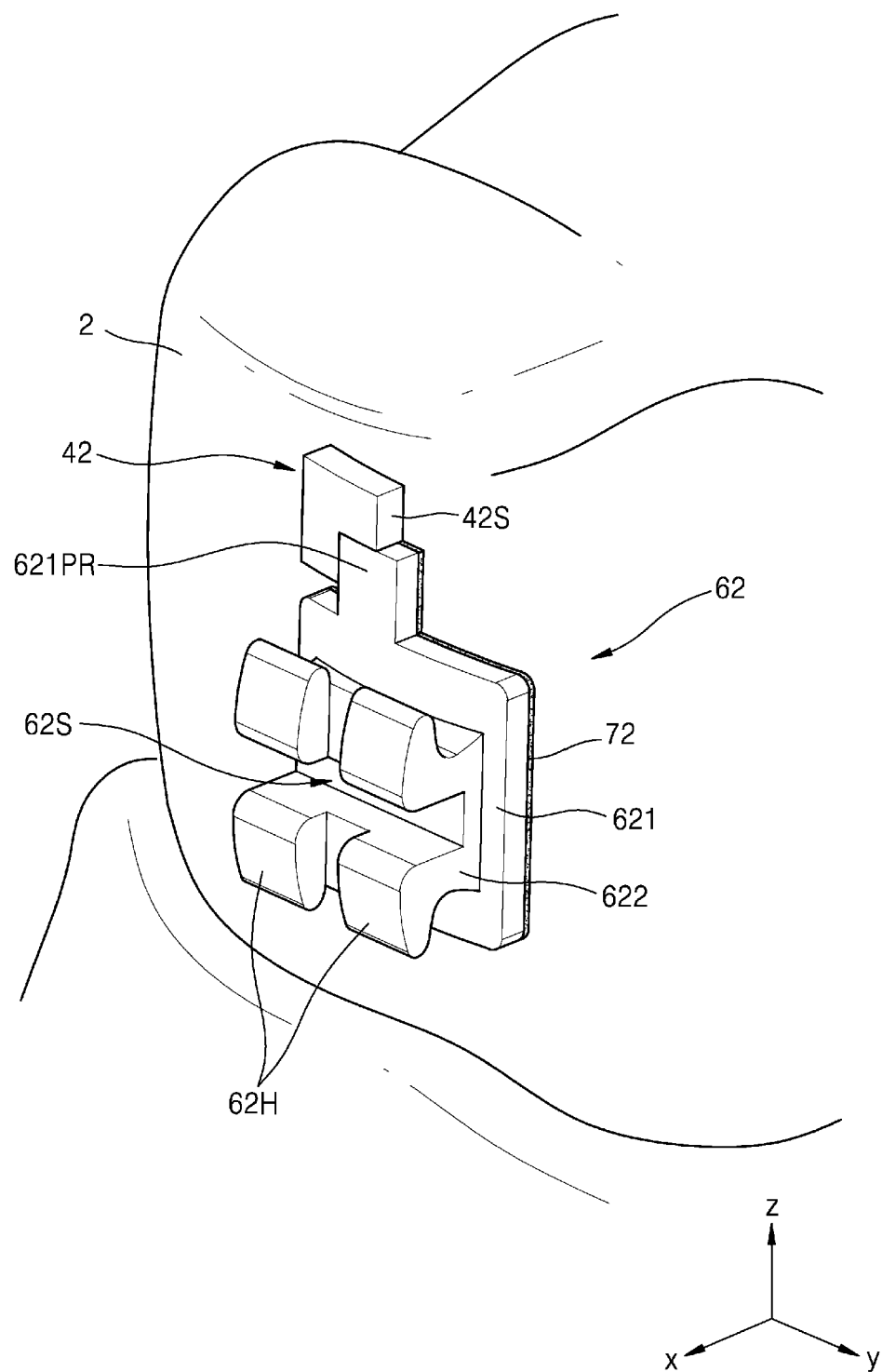
FIG. 14 is a conceptual view schematically illustrating a process of correcting teeth by using the orthodontic appliance, according to an embodiment.

FIG. 14 schematically illustrates an example where the orthodontic appliance 62 is attached to the tooth 2. As shown in FIG. 14, the protrusion 621PR of the orthodontic appliance 62 may have a shape that may contact the corresponding positioner 42 from among the positioners 31, 32, 33, ..., 41, 42, 43, .... In detail, the corresponding positioner 42 from among the positioners 31, 32, 33, ..., 41, 42, 43, ... may include a concave portion, and the protrusion 621PR of the orthodontic appliance 62 may have a shape corresponding to the concave portion. Accordingly, the side surface 621PRS of the protrusion 621PR, which is a contact portion of the orthodontic appliance 62, may contact a part of the side surface 42S of the positioner 42. In FIG. 14, the side surface 621PRS of the protrusion 621PR, which is a contact portion of the orthodontic appliance 62, is in surface contact with a part of the side surface 42S of the positioner 42.

The orthodontic appliance 62 may be attached to the tooth 2 through the adhesive 72 as shown in FIG. 14. The adhesive 72 may be located between a tooth contact surface of the base plate 621 and the tooth 2. That is, the adhesive may not be located between the outer surface 42S of the positioner 42 and the side surface 621PRS of the protrusion 621 PR, which is a contact portion of the orthodontic appliance 62.

Of course, the orthodontic appliance 62 may include a contact portion without having the protrusion 624PR. For example, a contact portion of the orthodontic appliance 62 may include a part of a side surface between one side (+x direction) and the other side (−x direction) of the orthodontic appliance 62. The part of the side surface of the base plate 621 may have a shape that may contact the corresponding positioner 42 from among the positioners 31, 32, 33, ..., 41, 42, 43, .... That is, the part of the side surface of the base plate 621 of the orthodontic appliance 62 may have a shape corresponding to a part of a side surface of the corresponding positioner 42 from among the positioners 31, 32, 33, ..., 41, 42, 43, .... Accordingly, the part of the side surface of the base plate 621 that is a contact portion of the orthodontic appliance 62 may contact the part of the side surface of the positioner 42. For reference, the part of the side surface of the base plate 621 that is a contact portion may have a curved surface, and the part of the side surface of the positioner 42 may also have a curved surface.

Figure 15:
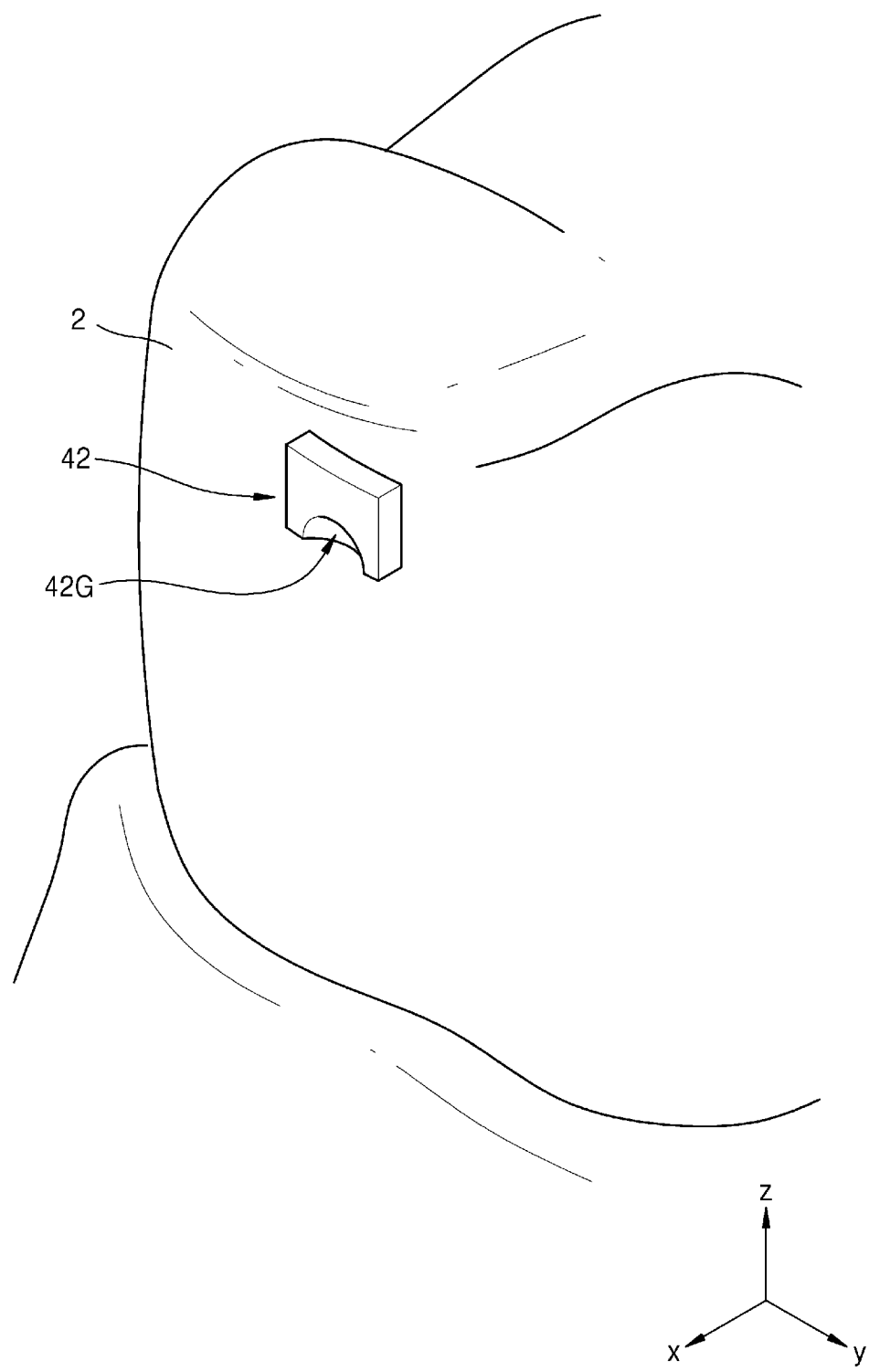
FIGS. 15 to 17 are conceptual views schematically illustrating a positioner that may be used in an orthodontic appliance, according to an embodiment.
Figure 16:
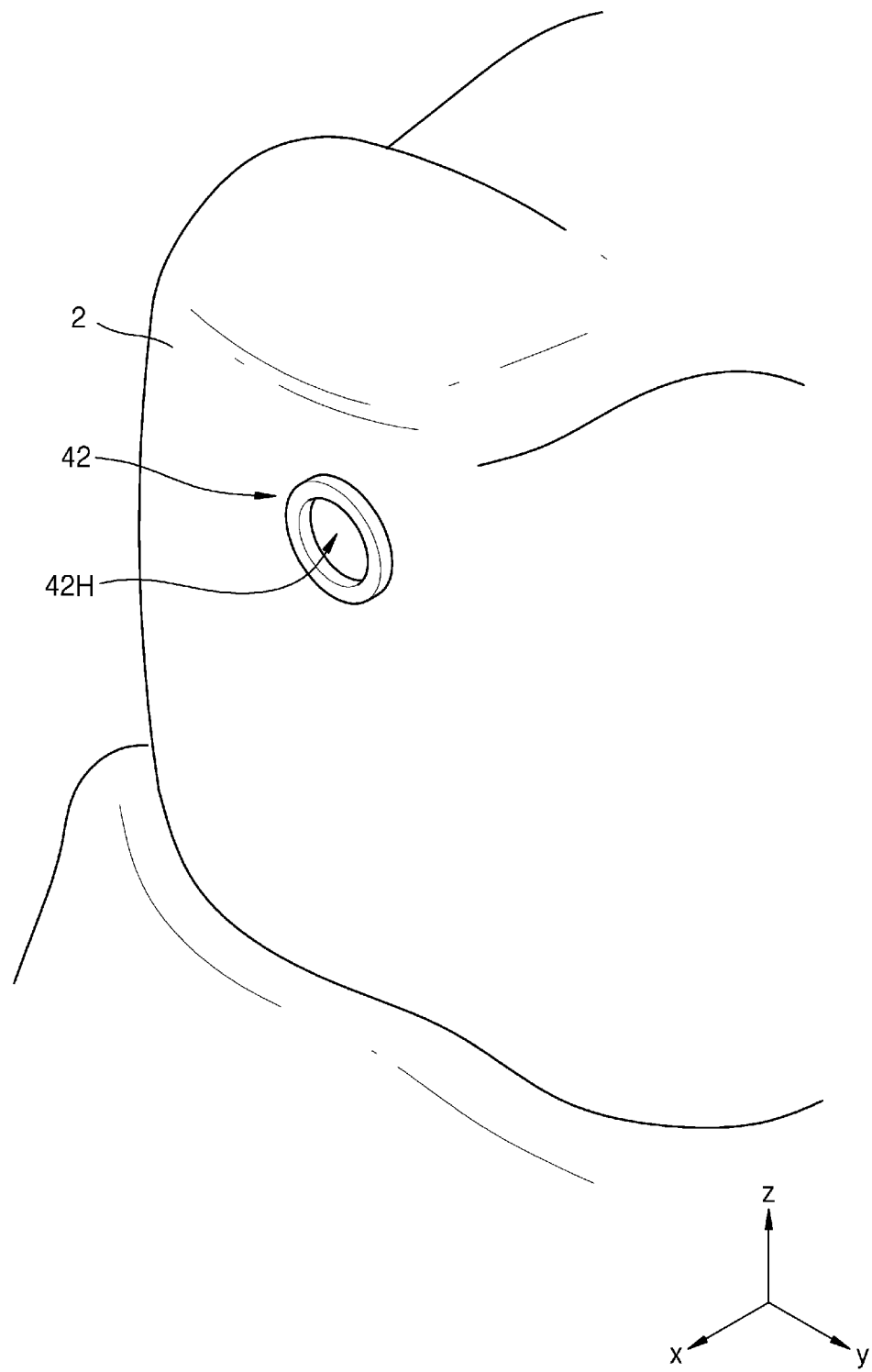
Figure 17:
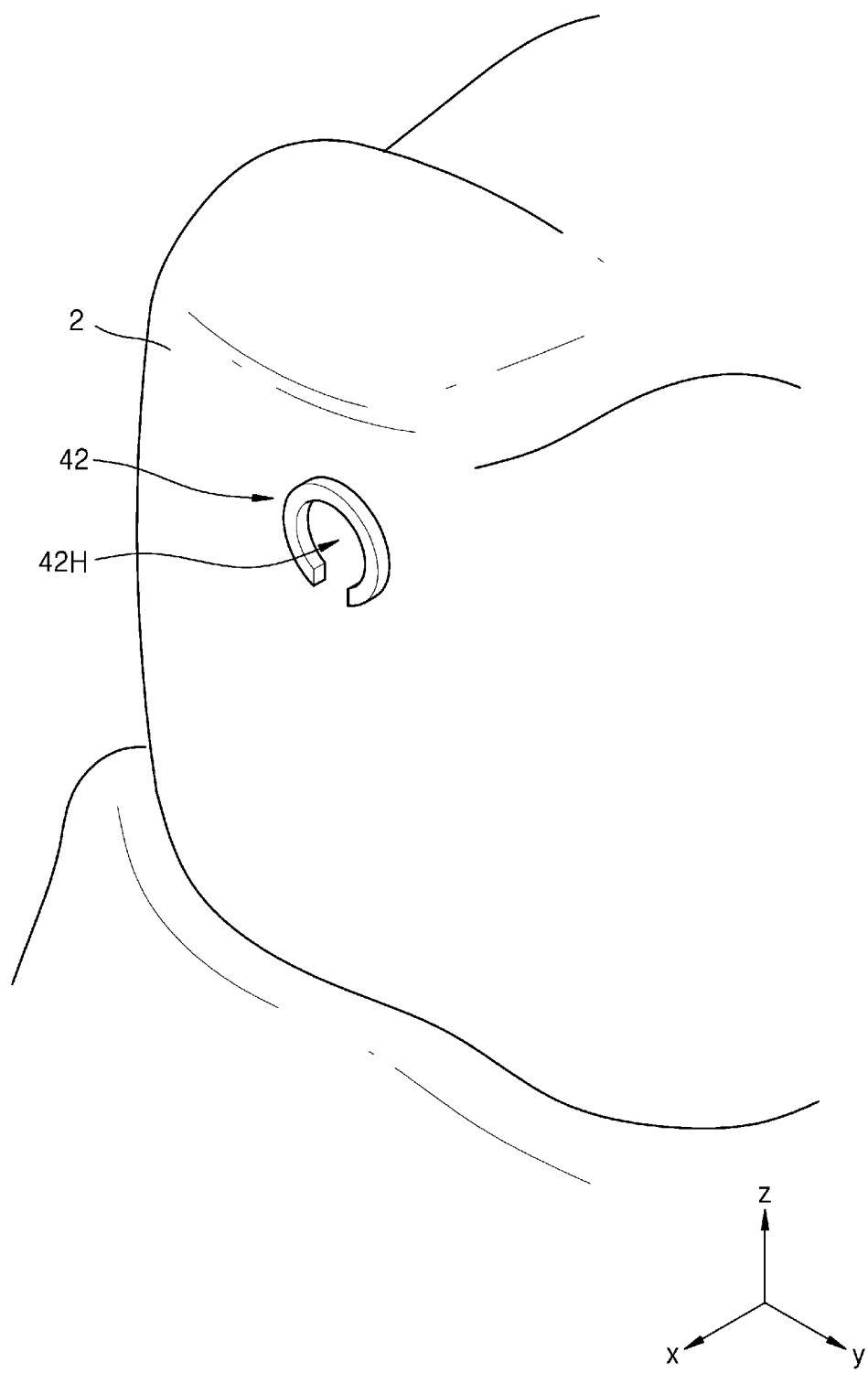

In addition, as described above, the positioners 31, 32, 33, . . . , 41, 42, 43, . . . may have any of various shapes. FIGS. 15 to 17 are conceptual views illustrating a positioner that may be used in an orthodontic appliance, according to an embodiment. For example, as shown in FIG. 15, the positioner 42 may have a substantially flat rectangular parallelepiped shape, but a concave groove 42G may be formed in a part of the positioner 42. Alternatively, unlike in FIG. 15, the positioner 42 may have a substantially flat rectangular parallelepiped shape with a part of a top surface inclined. Alternatively, as shown in FIG. 16, the positioner 42 may have a through-hole 42H in the center and thus may have a substantially ring shape, or as shown in FIG. 17, the positioner 42 may have a shape in which a part of the ring is removed and thus a part of the through-hole 42H in the center is exposed to the outside.

In any case, at least a part of the positioner 42 may be inserted into the groove 5210 formed in the tooth contact surface 52TFS of the orthodontic appliance 52 in a manner similar to that shown in FIG. 6, may contact an inner surface of the concave portion 621ID of the orthodontic appliance 62 as shown in FIG. 10, may contact the groove 62IO of the orthodontic appliance 62 as shown in FIG. 12, may contact an outer surface of the protrusion 621PR of the orthodontic appliance 62 as shown in FIG. 14, or may contact a side surface of the base plate 621 of the orthodontic appliance 62, thereby enabling the orthodontic appliance to be accurately located at a preset position.

According to an embodiment as described above, an orthodontic appliance that may be easily and accurately attached to teeth and a method of manufacturing the orthodontic appliance may be provided. However, the scope of the present disclosure is not limited by this effect.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope of the disclosure as defined by the following claims.

What is claimed is:

1. A method of manufacturing an orthodontic appliance, the method comprising:
    forming or attaching positioners each having a protruding shape on surfaces of a plurality of teeth to be corrected;
    obtaining scanning data on positions and shapes of the plurality of teeth to be corrected on which the positioners are formed or attached;
    obtaining, based on the scanning data, modeling data on positions and shapes of the teeth in an expected state after correction; and
    obtaining, based on the modeling data, orthodontic appliance data on shapes of orthodontic appliances attachable to the surfaces of the teeth in the expected state after correction so that each of the orthodontic appliances has a shape in which one side has a slot configured to accommodate an orthodontic wire to be inserted and another side opposite to the one side has a tooth contact surface, and each of the orthodontic appliances has the shape in which an adhesive is located between the tooth contact surface and the surface of the tooth to which the tooth contact surface is to be attached.

2. The method of claim 1, further comprising forming, based on the orthodontic appliance data, orthodontic appliances to be attached to the surfaces of the plurality of teeth to be corrected, by using three-dimensional (3D) printing.

3. The method of claim 1, wherein the obtaining of the orthodontic appliance data comprises obtaining the orthodontic appliance data so that each of the orthodontic appliances has the shape in which a groove configured to contact a corresponding positioner from among the positioners is formed in the tooth contact surface.

4. The method of claim 3, wherein the obtaining of the orthodontic appliance data comprises obtaining the orthodontic appliance data so that each of the orthodontic appliances has the shape in which a portion of the tooth contact surface outside the groove comprises a curved surface corresponding to a surface of a tooth to which the curved surface is to be attached.

5. The method of claim 3, wherein the obtaining of the orthodontic appliance data comprises obtaining the orthodontic appliance data so that each of the orthodontic appliances has the shape in which the corresponding positioner from among the positioners contacts the groove.

6. The method of claim 1, wherein the obtaining of the orthodontic appliance data comprises obtaining the orthodontic appliance data so that each of the orthodontic appliances has the shape in which a side surface configured to contact a corresponding positioner from among the positioners is located between the one side and the tooth contact surface.

7. A method of manufacturing an orthodontic appliance, the method comprising forming, based on the orthodontic appliance data obtained in the method of claim 1, orthodontic appliances to be attached to surfaces of a plurality of teeth to be corrected.

8. The method of claim 7, wherein the obtaining of the orthodontic appliance data comprises obtaining the orthodontic appliance data so that each of the orthodontic appliances has the shape in which a groove configured to contact a corresponding positioner from among the positioners is formed in the tooth contact surface.

9. The method of claim 8, wherein the obtaining of the orthodontic appliance data comprises obtaining the orthodontic appliance data so that each of the orthodontic appliances has the shape in which a portion of the tooth contact surface outside the groove comprises a curved surface corresponding to a surface of a tooth to which the curved surface is to be attached.

10. The method of claim 8, wherein the obtaining of the orthodontic appliance data comprises obtaining the orthodontic appliance data so that each of the orthodontic appliances has the shape in which the corresponding positioner from among the positioners contacts the groove.

11. The method of claim 7, wherein the obtaining of the orthodontic appliance data comprises obtaining the orthodontic appliance data so that each of the orthodontic appliances has the shape in which a side surface configured to contact a corresponding positioner from among the positioners is located between the one side and the tooth contact surface.

* * * * *